(12) United States Patent
Agrawal et al.

(10) Patent No.: US 6,801,756 B1
(45) Date of Patent: Oct. 5, 2004

(54) METHOD AND SYSTEM FOR DYNAMIC EVALUATION OF A WIRELESS NETWORK WITH A PORTABLE COMPUTING DEVICE

(75) Inventors: Ajay Agrawal, Dallas, TX (US); Sriharsha Sathya, Carrollton, TX (US); Yashovan Neelakantamurthy, Carrollton, TX (US); Apurva Prakash, Carrollton, TX (US); Raghavendra Malpani, Dallas, TX (US); Abhishek Saraswati, Carrollton, TX (US); Suryaprashant Rao, Dallas, TX (US); Ashish Hate, Dallas, TX (US); Peter O. Schmitz, Nettetal (DE)

(73) Assignee: Networks Associates Technology, Inc., Santa Clara, CA (US)

( * ) Notice: Subject to any disclaimer, the term of this patent is extended or adjusted under 35 U.S.C. 154(b) by 313 days.

(21) Appl. No.: 10/071,907

(22) Filed: Feb. 8, 2002

(51) Int. Cl.$^7$ .............................................. H04B 17/00
(52) U.S. Cl. ................. 455/67.11; 455/566; 455/556.1; 455/557; 370/908; 370/280; 370/437
(58) Field of Search .............................. 455/67.11, 445, 455/556.2, 556.1, 557, 566; 370/908, 909, 242, 252, 280, 349, 437

(56) References Cited

U.S. PATENT DOCUMENTS

| | | | | |
|---|---|---|---|---|
| 5,459,728 A | * | 10/1995 | Yoshioka et al. | 370/332 |
| 5,850,187 A | * | 12/1998 | Carrender et al. | 340/10.6 |
| 5,850,386 A | * | 12/1998 | Anderson et al. | 370/241 |
| 6,069,896 A | * | 5/2000 | Borgstahl et al. | 370/401 |
| 6,078,566 A | * | 6/2000 | Kikinis | 370/286 |
| 6,167,064 A | * | 12/2000 | Cohn et al. | 370/522 |
| 6,243,372 B1 | * | 6/2001 | Petch et al. | 370/350 |
| 6,499,054 B1 | * | 12/2002 | Hesselink et al. | 709/204 |
| 6,545,994 B2 | * | 4/2003 | Nelson et al. | 370/337 |
| 6,674,738 B1 | * | 1/2004 | Yildiz et al. | 370/338 |
| 6,697,337 B1 | * | 2/2004 | Cafarelli et al. | 370/253 |

FOREIGN PATENT DOCUMENTS

WO      01/26335 A2    12/2001    .......... H04L/29/06

OTHER PUBLICATIONS

AirMagnet, Inc., "The AirMagnet Wireless Handheld Analyzer", www.airmagnet.com, 2002.
AirMagnet, Inc., "AirMagnet Frequently Asked Questions", www.airmagnet.com.

* cited by examiner

Primary Examiner—Marceau Milord
(74) Attorney, Agent, or Firm—Silicon Valley IP Group, PC; Kevin J. Zilka; Christopher J. Hamaty

(57) ABSTRACT

Aspects of the invention are found in an apparatus for monitoring data on a wireless network. The data is transmitted according to a wireless data network protocol across the network. The apparatus is contained on a portable wireless network analysis device. The portable wireless network analysis device has a wireless network interface that communicatively couples the portable wireless network analysis device to the wireless network. This allows the portable wireless network analysis device to receive data from the wireless network. The portable wireless network analysis device also has a network traffic analyzer. The network traffic analyzer is communicatively coupled to the wireless network interface. The analyzer receives and analyzes the data received from the wireless network. The portable wireless network analysis device is capable of being operated by user at one location and transported to second location. The portable wireless network analysis device is able to continue to monitor data on the wireless network while being transported from the first location to the second location. The apparatus may also have a user interface. Information about the data may be displayed on the user interface. In a specific instance, the user interface is a display screen. The apparatus can have a storage system. The storage system stores the data when initiated by a user. The apparatus can also have a filter system. The filter system filters the data based on a predefined criteria. The apparatus may have an alarm system. The alarm system indicates when a predefined network event has occurred.

78 Claims, 8 Drawing Sheets

METHOD AND SYSTEM FOR DYNAMIC EVALUATION OF A WIRELESS NETWORK WITH A PORTABLE COMPUTING DEVICE

BACKGROUND

1. Field of the Invention

The current invention is directed to a system and method for evaluating wireless network traffic. In particular, the current invention is directed to a portable device that can monitor network traffic on a dynamic basis.

2. Description of the Art

Many network monitoring systems monitor the transport layer or internet layer when analyzing the performance of many networked systems. Others only analyze the physical layer. A spectrum analyzer is a typical wireless tool to detect general radio interferences or signal coverage holes. However, most networks in use when these monitoring systems were developed were static or hard wired networks. Thus, the analysis of the top levels of the network protocol allowed administrators to diagnose problems affecting the underlying protocol layers indirectly.

However, with the advent of mobile computing and of wireless communications, the typical network can include substantial portions of dynamic network legs. In this case, the network legs can be mobile and change the link characteristics, depending upon the local radio environment characteristics. In this manner, typical analysis of the topmost layers of the network protocol cannot deal effectively and timely with the problems presented with the advent of wireless legs in the network, or of a network made entirely of wireless links.

Accordingly, when a problem occurs in a wireless network, it is very difficult to determine its cause using the typical hard-wired monitoring technology to determine where the problem exists. It may occur at the sending end, within the wireless channel, at the receiving end, at an access point (AP), which is the wired to wireless bridge or at any other interconnection device, like a switch, router, or application gateway.

Additionally, wireless networks have become very popular in the last number of years. Working without any cable limitations is very convenient. However, the tools to troubleshoot or analyze these types of networks typically do not work without cables, nor do they work outside of a static platform. In this manner, they are not easily or flexibly carried around. In this manner, these tools do not easily allow an analyzer to be transported to various physical points within the wireless network, and to analyze the network and physical characteristics associated with the links in the network.

Further, the point at which the station is relative to the receiver or transmitter can play an important role. As such, the pure wireless connection and the role the relative positions of the units add a complexity to the wired network model.

In this manner, many typical wireless monitoring systems and methods suffer one or more shortcomings. Many other problems and disadvantages of the prior art will become apparent to one skilled in the art after comparing such prior art with the present invention as described herein.

SUMMARY

Aspects of the invention are found in an apparatus for monitoring data on a wireless network. The data is transmitted according to a wireless data network protocol across the network. The apparatus is contained on a portable wireless network analysis device.

The portable wireless network analysis device has a wireless network interface that communicatively couples the portable wireless network analysis device to the wireless network. This allows the portable wireless network analysis device to receive data from the wireless network.

The portable wireless network analysis device also has a network traffic analyzer. The network traffic analyzer is communicatively coupled to the wireless network interface. The analyzer receives and analyzes the data received from the wireless network.

The portable wireless network analysis device is capable of being operated by a user at one location and transported to second location. The portable wireless network analysis device is able to continue to monitor data on the wireless network while being transported from the first location to the second location.

The apparatus may also have a user interface. Information about the data may be displayed on the user interface. In a specific instance, the user interface is a display screen.

In a particular aspect, the apparatus is a personal digital assistant, which is commonly named as PDA. It should be noted that several computing devices might be used, as well, such as a palm-top device, a laptop device, or any other portable computing device.

In another aspect, the apparatus has a storage system. The storage system stores the data when initiated by a user.

The apparatus may have a filter system. The filter system filters the data based on a predefined criteria. In one case the predefined criteria is a network address. In yet another, the predefined criteria is a packet type. It should be noted that several types of predefined criteria may be imagined using parameters associated with network devices, network events, or physical parameters associated with the wireless network, such as channel or noise characteristics therein.

The apparatus may have an alarm system. The alarm system indicates when a predefined network event has occurred.

The predefined network event may be based on the usage characteristics of the network. These events include a rate of data exchange, or a utilization rate, to name a few examples.

The predefined network event may also be the occurrence of a specific network event. Such specific network events may indicate an error in data transmission, may be based on a network address, or may be a predetermined number of network events like checksum errors or frame errors. Additionally, the predefined network event may be based on a rate of specific network events.

Other aspects of the invention are drawn to an apparatus for monitoring data on a wireless network. The data is transmitted according to a wireless network protocol, and the data is arranged in a transport protocol. The apparatus is a portable wireless network analysis device.

The portable wireless network analysis device contains a wireless network interface that couples the portable wireless network analysis device to the wireless network. This allows the portable wireless network analysis device to receive data from the wireless network.

The apparatus contains a network traffic analyzer communicatively coupled to the wireless network interface. The network traffic analyzer receives the data and performs an analysis of the data relative to the wireless network protocol.

The portable wireless network analysis device is capable of being dynamically relocated from a first location to a second location. The portable wireless network analysis device is able to monitor the wireless network traffic during the relocation from the first location to the second location. Other aspects of the preceding apparatus may all be envisioned in this aspect as well.

Other facets of the invention are drawn to an apparatus for monitoring data on a wireless network transmitted according to a wireless network protocol. The apparatus has a computer readable medium containing instructions, where the apparatus is responsive to the instructions.

The apparatus contains instructions for receiving data from the wireless network with a wireless network interface. The wireless network interface is contained in a portable wireless network analysis device.

The apparatus contains instructions for analyzing the wireless network data. Moreover, the apparatus is selectively relocatable from a first location to a second location. The portable wireless network analysis device is still able to perform the steps of receiving and analyzing concurrently with the relocation. Other aspects of the preceding apparatus may all be envisioned in this aspect as well.

Still other facets of the invention are found in a method for monitoring data on a wireless network. The data is transmitted according to a wireless network protocol on the network.

The method contains the step of receiving data from the wireless network in a portable wireless network analysis device having a wireless network interface and analyzing the wireless network data. The portable wireless network analysis device may be selectively relocated from a first location to a second location. The portable wireless network analysis device is still capable of performing the steps of receiving and analyzing concurrently with the step of relocating. All aspects of the method and the apparatus used should be construed as capable of being transferred from one to another.

Other aspects, advantages, and novel features of the present invention will become apparent from the detailed description of the invention when considered in conjunction with the adaptively clocked accompanying drawings.

BRIEF DESCRIPTION OF THE DRAWINGS

FIG. 1 is a schematic diagram of a typical wireless network that the invention may be used in.

DETAILED DESCRIPTION OF THE PREFERRED EMBODIMENT

Figure 1:
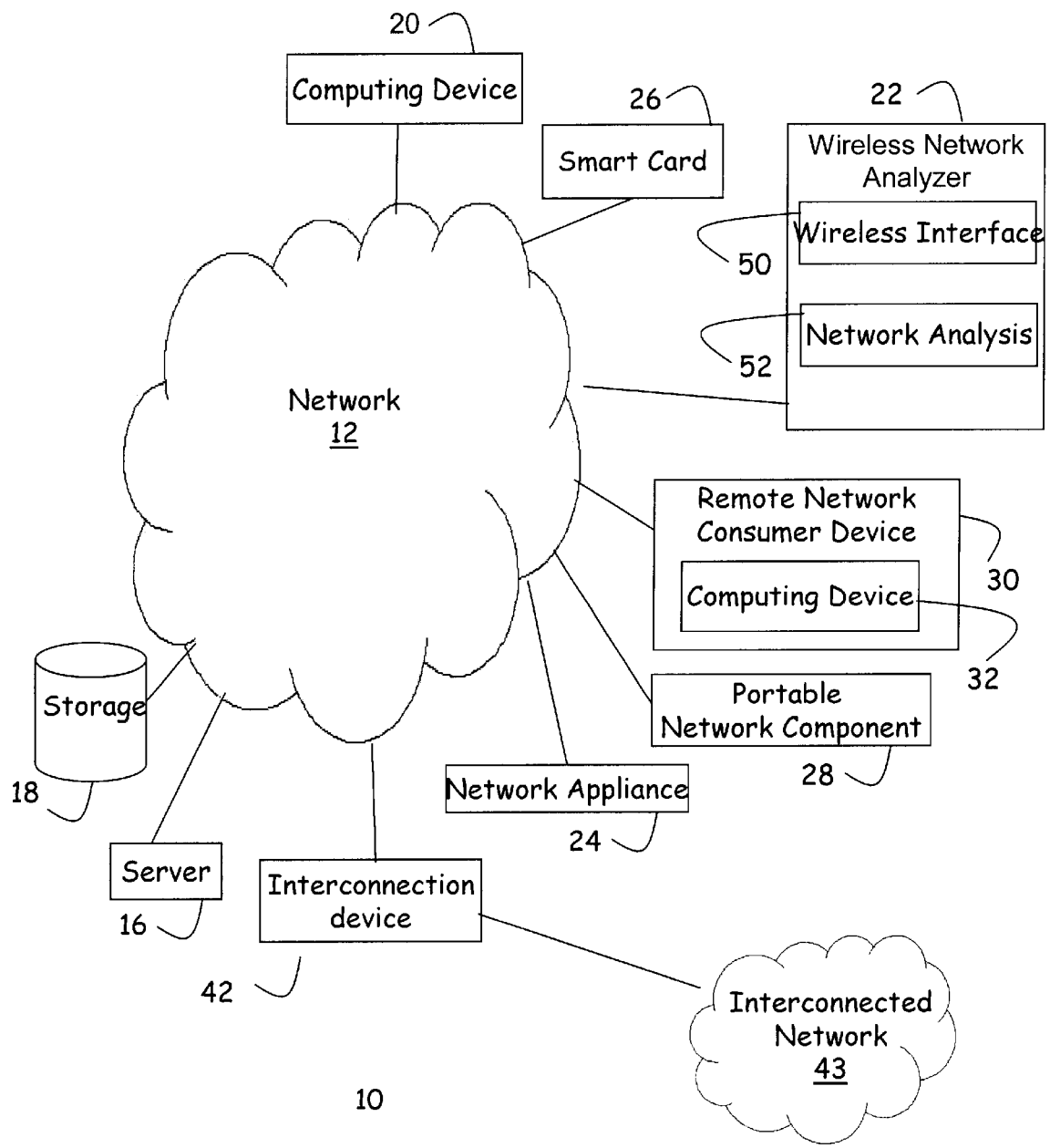

FIG. 1 is a schematic diagram of a typical wireless network that the invention may be used in. More specifically, portable wireless network analysis devices, such as a portable wireless network analysis device 22, implement the invention to be used in conjunction with the wireless network traffic.

A distributed data processing system 10 contains a wireless interconnected network 12. The network 12 provides a communications link for data traffic between all the various computing or processing devices and computers connected within the distributed processing system 10. It should be noted that any of the devices communicatively coupled to the network 12 may be coupled through one or more wireless links. The devices shown may be coupled in a peer-to-peer arrangement, or through some central interconnect device that is contained in the network 12. It should be noted that any part of network 12 may be made of pure wireless links, or a mixture of wired and wireless links.

The network 12 includes such wireless links as embodied by protocols such as the 802.11 standards promulgated by international standards organizations. This is in addition to all other types of wireless technologies, such as satellite infrared, or other radio frequency computer communication technologies.

In fact, the method of operation may be extended to those wireless technologies not necessarily defined as a network technology. These include technologies such as the Bluetooth standard for device-device communication under infrared, as an exemplary wireless communication technology that may also employ the benefits of the subject of this application.

The network 12 may operate under a number of different operating schemes. Communications may flow between the associated components of the distributed processing system 10 under various protocols, including TCP/IP, IPX, Appletalk, or any of a number of associated protocols. Underlying wireless protocols can include such protocols as those envisioned under an 802.11 standard, as mentioned above. The network 12 may also be indicative of several interconnected networks. Other wireless communications between computing devices may be found in infrared communications schemes, though not explicitly set up as a network protocol. These other wireless communications protocols may include those such as promulgated by the Bluetooth standard.

The network 12 connects a plurality of devices, which are described now. This can be a general computing device 20 and a server 16. Additionally, a storage unit 18 can also be connected to the network 12, thus allowing the computing device and the server 16 to communicate with and store data to and from the storage unit 18.

Additional computing components that connect to the network 12 may include a remote network appliance 24. These network appliances may include autonomous data collection devices.

Additionally, the network may couple such devices as portable network component 28. Such equipment is typically used in inventory practices or delivery practices. These components can include such devices as scanners and other tracking type mechanisms.

The network 12 may couple remotely located computing devices 32 having enabled network interfaces. These computing devices may be embedded in a consumer device 30. Exemplary consumer devices include such items as vending machines, automated teller machines, automated payment machines for use at stores and kiosks, or any device connected via a wireless protocol to a wireless network.

Additionally, an individual user may carry a so-called "smart card" 26. The smart card may contain sufficient data and/or processing capabilities to allow connection to and communication with other components of the distributed data processing system 10.

It should also be noted that the distributed data processing system might also include numerous different types of networks. Any one of, or any combination of, for example, an intranet, a local area network (LAN), a wide area network (WAN), or an aggregation of units may be connected to each other in a fashion.

If using the network in a secure fashion, the network may be local to the individual clients. In another manner, such a secure network may be implemented upon a public network using various security protocols, thus creating a virtual private network (VPN) molded from the public network infrastructure. Additionally, the present invention may be implemented on a variety of hardware and software platforms, as described above.

Additionally, an interconnection device 42 can be used in the network 12 to connect different segments, and topologies. Some examples of these devices are switches, routers, access points, base stations, firewalls or other gateways. Interconnection devices can also be used to couple different interconnected networks.

Additionally, any of the aforementioned devices may have a direct or indirect link through the interconnection device 42. In this manner, for example, any one device associated with the network 12 may directly transmit data to any of the other devices associated with the network or an interconnected network. Additionally, any of the aforementioned devices may act as a type of interconnection device. In this manner, any of the aforementioned devices may pass along data from any one of the other aforementioned devices to another aforementioned device through an intermediary link or device.

The portable wireless network analysis device 22 contains a wireless interface 50. The wireless interface 50 couples the portable wireless network analysis device 22 to the network 12. Depending on the location of the portable wireless network analysis device relative to any of the other computing devices described above, the wireless interface 50 receives packets of information destined to any of the attached computing devices associated with the wireless network 12.

In one instance, when the portable wireless network analysis device 22 is in one location, it may receive packets originally transmitted or retransmitted by a subset of the devices mentioned above. In other instances, when the portable wireless network analysis device 22 moves from one location to another, the portable wireless network analysis device 22 may receive packets transmitted or retransmitted by a different subset of the devices.

In addition to the wireless interface, the portable wireless network analysis device 22 contains a network analysis module 52. In the operational aspects, packets of the data traveling in the network 12 are captured by the wireless interface 50. The packets and/or the contents of the transmissions are relayed to the network analysis module 52.

In exemplary aspects, the network analysis module performs statistics, analysis, and diagnostics on the wireless network traffic being carried on the wireless network 12. Various type of information, such as source addresses, destination addresses, dropped packets, packet types, or packet sizes are collected and collated by the network analysis module 52.

Error analysis on the individual packets or frames may also be performed. These errors may include checksum errors, undersize or oversize errors, frame misalignment, or broadcast or multicast type errors associated with wireless networks.

Statistics on network traffic may also be performed. These functions include collation of packet totals, distribution of packet sizes, numbers of broadcasts, numbers of multicasts, numbers of errors of varying types, channel use statistics, utilization statistics, or packet rate statistics.

Additionally, several filtering aspects may be implemented as well. The network analysis module 52 selectively processes packets based on type, source address, destination address, source-destination pairs, broadcast and/or multicast, wireless channel, computer "hop", "hop" numbers, or other criteria. This other criteria can be any characteristic relating to the machines on the network, characteristics relating to the data or packets, or characteristics relating to the network itself.

In contradistinction to the real time aspect where the packets are analyzed on the fly for the particular trait or quality and then discarded, as described above, the portable wireless network analysis device 22 can store network traffic in a buffer associated with the network analysis module 52. In this manner, a "record" and "analyze" sequence can be performed on a series of packets or other network traffic. In this manner, a full analysis of the complete sequence of network data traffic may be performed at a later time. A series of analyses and statistics may be developed for the recorded network traffic.

In other uses, the network analysis module 52 implements alarm signals based on network characteristics. For example, the network analysis module 52 monitors the traffic on the network 12. When certain occurrences happen, or thresholds are met, then the network analysis module 52 can initiate an alarm indicating the problem.

The alarm may be triggered selectively based on an operator's actions or selections. This selective triggering may include detailing one alarm with a selected alarm level, triggering an alarm when certain events happen, or triggering an alarm when logical combinations of occurrences happen.

For example, an alarm may be set when the ratio of packets with checksum errors reached a certain level. Or, an alarm could be set for the occurrence of frame alignment errors. Other alarm criteria may include miss-sized packets, utilization rate thresholds exceeding or falling below predetermined levels, packet rates exceeding or falling below predetermined levels, errors in multicast or broadcast packets, source-destination errors, or any of a number of other network parameters.

Additionally, the alarm triggers may be logical combinations of alarm events. For example, an alarm may be set when checksum errors are above a certain ratio, but only when the packet rate is also above a certain rate. In this manner complex analysis of the wireless network 12 may be performed.

Additional features of the portable wireless network analysis device include a capture engine. The user can selectively set a capture buffer size. The filters can be used with the capture engine to selectively screen the network data collected.

A decode engine may be utilized as well. The user can observe summaries, details, or hex dumps of data packets. The decode engine can apply parameters to locate specific frames. This can be by frame number, by text search, or by mark current frame. Time information is also decoded. This information includes relative time, delta time, and absolute time information.

The analysis module can also include a real time reporting module. As one example, this can be used in an 802.11 network to find all access points (APs) within range. It can display relative load on each AP within range, based on throughput and data throughput.

The analysis module can also perform response time calculations. In one case, the TCP/UDP based application response time is provided for port based applications. Response time can also be measured based on the application layer and the true server client application response time.

Additionally the analysis module can report on statistics collected by the individual channels during channel surfing activity. This data includes control, data, and management frames. Additionally, such information, errors, retries, and different packet speeds can be reported.

In this manner, the portable wireless network analysis device allows users to see problems in real-time. This includes rogue AP detection (detecting access points that are not on the specified AP list), association failures, authentication failures, excessive noise, re-association failures, and frame timeouts, to name but a few.

Channel surfing capabilities are also provided. This allows the user to stay on every channel for a predetermined amount of time and then rove to the next selected channel.

Users can define triggers based on traffic parameters or network characteristics. Such triggers can include packets per second, or any other alarm condition or network condition, or combination of network conditions. Such alarms or triggers can be associated with specific actions on the portable wireless network analysis device. Such actions performed in light of any trigger, alarm, or combination thereof, include capture, save to disk, or the viewing of specific monitors or data.

In one aspect, the analysis of the application, presentation, session, or transport layers of the layered protocol scheme may be subsequent to analysis of the lower level protocols, or in conjunction thereof. In this aspect, the wireless monitoring concentrates on the structure and interaction of the network messages and the network itself relative to the physical, data link, and possibly network layers. In this manner, the monitoring of wireless networks is done at a lower layer than most typical network monitoring products but at a higher layer than physical-only-testers can do.

Links to the wireless network card will allow the system to observe and monitor the power levels associated with the network traffic. In this case, the reception characteristics of the wireless data from various points may be monitored and stored for analysis.

Figure 2A:
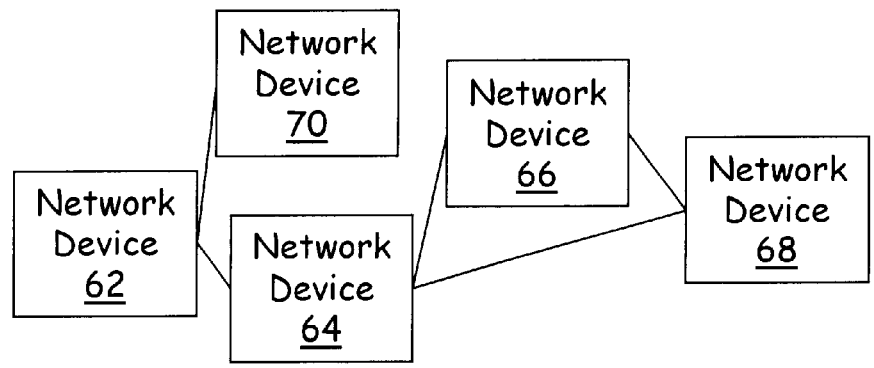
FIGS. 2a, 2b, and 2c are generalized network diagrams showing the placement characteristics of the portable wireless network analysis device of FIG. 1.
Figure 2B:
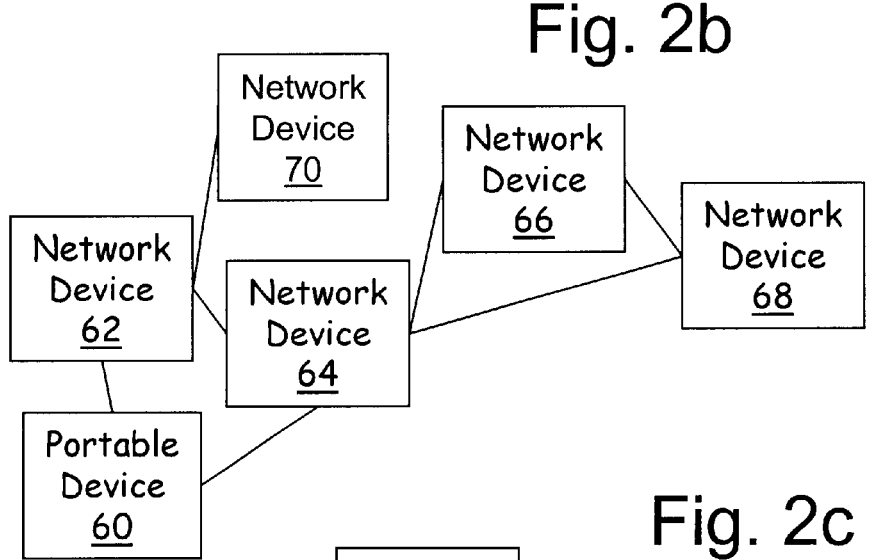
Figure 2C:
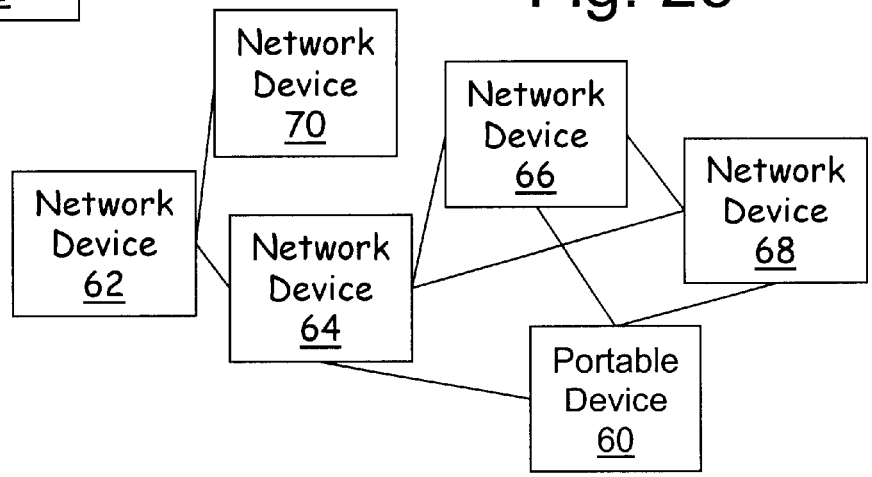

FIGS. 2a, 2b, and 2c are generalized network diagrams showing the placement characteristics of the portable wireless network analysis device of FIG. 1. In a wireless network, components can move in relation to one another, as opposed to a wired network in which the connections between the devices remain static and defined. FIGS. 2a–c are general network topology diagrams, detailing possible implementations of the portable wireless network analyzer of FIG. 1. The network shown in the FIGS. 2a–c shows general details relevant to both peer-to-peer wireless networks, and wireless networks based on interconnect devices coupled to a wired network or another wireless network. As such, following the description invention should be read as relating to peer-to-peer networks, networks based on couplings to an access point or other type device, or any combination thereof.

In FIG. 2a, the wireless network couples the network devices 62, 64, 66, 68, and 70. In this manner, the wireless network has several interlinks. In FIG. 2b, the portable wireless network analysis device 60 is originally placed at one location in the network, whereby it maintains contact to the network such that it can capture the network traffic to the devices 62 and 64. In this manner, the traffic that the devices 62 and 64 see may be analyzed. This includes the traffic inbound and outbound from those devices, as well as any traffic that includes those devices in any hops to other devices.

In FIG. 2c, the portable wireless network analysis device 60 is originally placed at another location in the network, whereby it maintains contact to the network such that it can capture the network traffic to the devices 64, 66, and 68. In this manner, the traffic that the devices 64, 66, and 68 see may be analyzed. This includes the traffic inbound and outbound from those devices, as well as any traffic that includes those devices in any hops to other devices. In this manner, the portable wireless network analysis device 60 can analyze with granularity the sub-portions of a wireless network on an as needed basis.

This is particularly apparent when one realizes that the devices 62, 64, 66, 68, and 70 can all move relative to one another. In this manner, the portable wireless network analysis device 60 can analyze the fluid changes inherent in the wireless networking scheme.

For example, such changes may include physical relocation of a device, or a channel change of a device. It should be noted that, in current implementations, the portable wireless network analyzer could analyze these changes in various ways. For example, the portable wireless network analyzer can perform a search across channels for ID pairs to relocate the particular device. In this manner, the changes inherent in the wireless networking can be achieved.

It should be noted that while the devices 62, 64, 66, 68, and 70 are able to move, any one might be a stationary device. These devices include access points and other stationary network devices as described in FIG. 1.

In many networking schemes, the routing or network legs may take differing topologies, depending on the specific implementation. It should be noted that FIGS. 2a–c are meant to be generic for all wireless linked networks. It should also be noted that the portable wireless network analyzer may only see one side of a data transaction. For instance, the portable wireless network analyzer may be at a physical location that is relatively near one other device, such as the device 66, but substantially farther away from another. In this case, the portable wireless network analyzer may be able to monitor the data outbound from the device 66, but may not be able to monitor data inbound to it.

Specifically, in many implementations, the topologies can follow differing views, depending upon the specific hardware involved. For example, each wireless node may interconnect with other wireless nodes in a peer-to-peer arrangement. But in most cases the mobile wireless nodes communicate with fixed devices like access points, which forward the signal to and from the wired network. This mode is usually called infrastructure mode.

Thus, the numerous nodes are interconnected in this case in a weave-like fashion, much like that depicted above in relation to FIGS. 2a–c. In a specific aspect, this peer-to-peer arrangement is implemented in the 802.11 standard, and is called an Independent Basic Service Set (IBSS) configuration.

In another aspect of the same 802.11, a wireless access point (AP) defines a service range for the wireless network devices. In particular, the network devices in contact with the AP define a basic service set (BSS). Interconnected BSS networks make up an extended service set (ESS) topology. The access points may be coupled through wireless or wired means, or some combination thereof.

In particular, subnetworks within each service set may be defined. In this case, when a particular wireless network device is in communication with the particular subnetworks, the particular wireless network device may have a need to define itself as a node in any particular subnetwork. Alternatively, the wireless device can be configured to respond to all the subnetworks.

To differentiate the subnetworks or particular networks, each particular subnetwork or network may have an identification associated with it. In this case, the communications for one network will be ignored by those devices associated with another network based, at least in part, by this identification associated with the transmissions of data.

In the case of an 802.11 protocol, this is accomplished by an Extended Service Set Identifier (ESSID), which identifies the wireless local area network (LAN). The ESS/D of the mobile device must match the ESS/D of the AP to communicate with the AP. ESS/D is a 32-character maximum string and is case-sensitive.

Figure 3A:
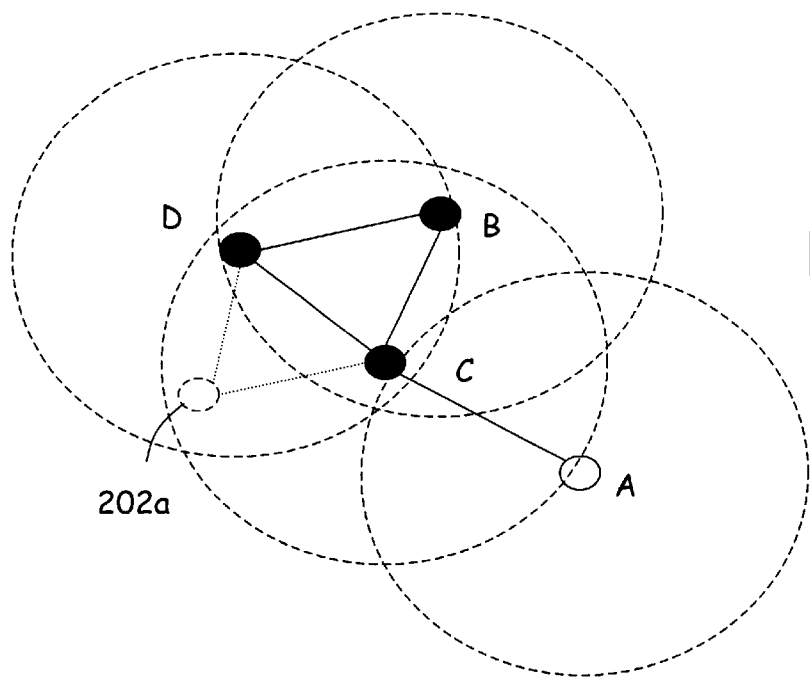
FIGS. 3a and 3b are specific implementations of a wireless network diagram detailing the implementation of the FIGS. 2a–c.
Figure 3B:
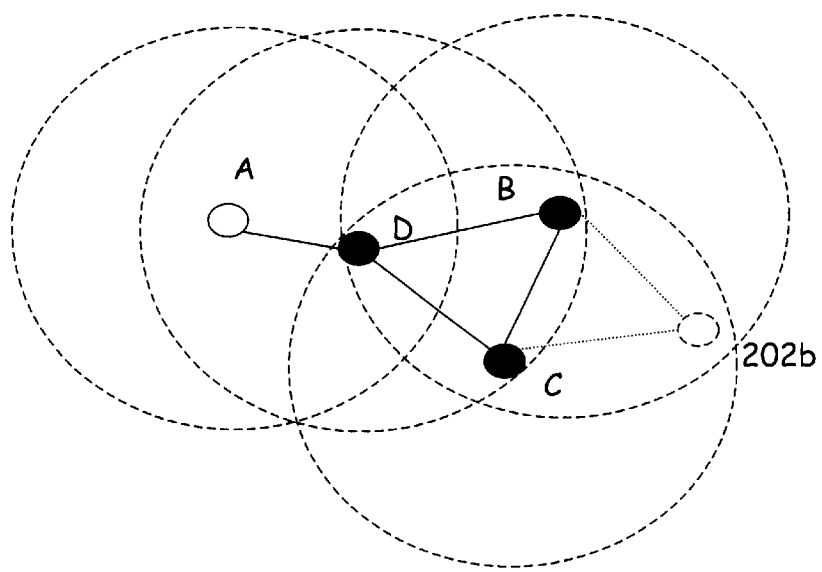

FIGS. 3a and 3b are specific implementations of a wireless network diagram detailing the implementation of the FIGS. 2a–c. FIG. 3a is a network topology diagram detailing the implementation of a peer-to-peer network. The portable wireless network analyzer 202 is shown in two differing locations, and one of the wireless devices is shown in a differing location. In the first instance, the portable wireless network analyzer is located at the point earmarked by the point 202a.

In this instance, the wireless devices A, B, C, and D form a peer-to-peer network, based on the various wireless ranges. Since the portable wireless network analyzer 202a is within range of the devices D and C, the portable wireless network analyzer 202a can monitor the data on the links legs outgoing from these nodes In FIG. 3b, the wireless device A has moved, and as a result of the move, it can link up with device D. Also, the portable wireless network analyzer 202b has moved to be within range of the signal emanating from the wireless devices B and C. As such, the portable wireless network analyzer 202b can monitor the wireless network traffic from those devices.

Figure 4A:
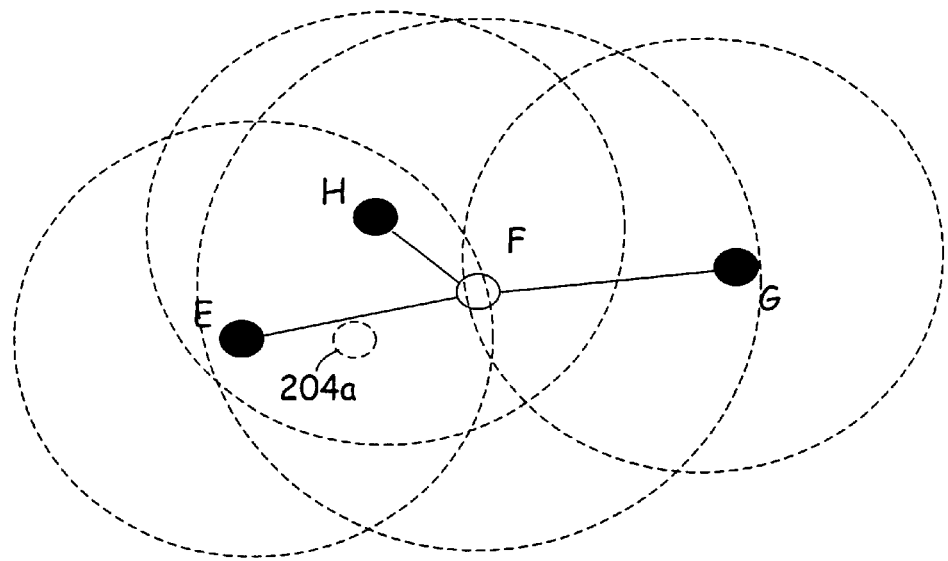
FIGS. 4a and 4b are specific implementations of a wireless network diagram detailing the implementation of the FIGS. 2a–c.
Figure 4B:
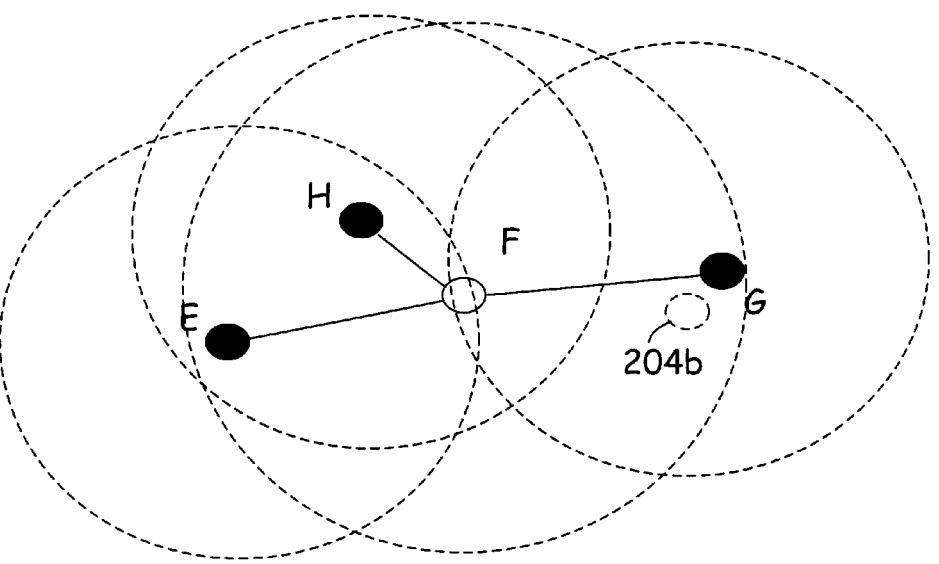

FIGS. 4a and 4b are specific implementations of a wireless network diagram detailing the implementation of the FIGS. 2a–c. FIG. 4a is a network topology diagram detailing the implementation of an enterprise network, or one that is serviced by a central access point. Of course, the mode and topology are for exemplary purposes only. The actual operation of the network may vary based on the specific devices, protocols, and possibly modes of operation of the various devices.

In this instance, the wireless devices E, F, G, and H form a network. The network device F is an access point, and is both within broadcast and reception range of the wireless devices. Since a portable wireless network analyzer 204a is within the broadcast range of F, all data emanating from F may be monitored by the portable wireless network analyzer 204a. The portable wireless network analyzer 204a is within the broadcast range of the wireless devices H and E, all data emanating from the wireless devices H and E may monitored by the portable wireless network analyzer 204a.

In FIG. 4b, the portable wireless network analyzer 204b has changed location to another point. Since the portable wireless network analyzer 204b is still within the broadcast range of F, all data emanating from F may still be monitored by the portable wireless network analyzer 204b. The portable wireless network analyzer 204b is within the broadcast range of only the wireless device G, and as such, all data emanating from the wireless device G may be monitored by the portable wireless network analyzer 204b. However, the portable wireless network analyzer 204 is not now within the broadcast range of the wireless devices H and E. Thus, the data emanating from the wireless devices H and E may not now be monitored by the portable wireless network analyzer 204b.

Figure 5:
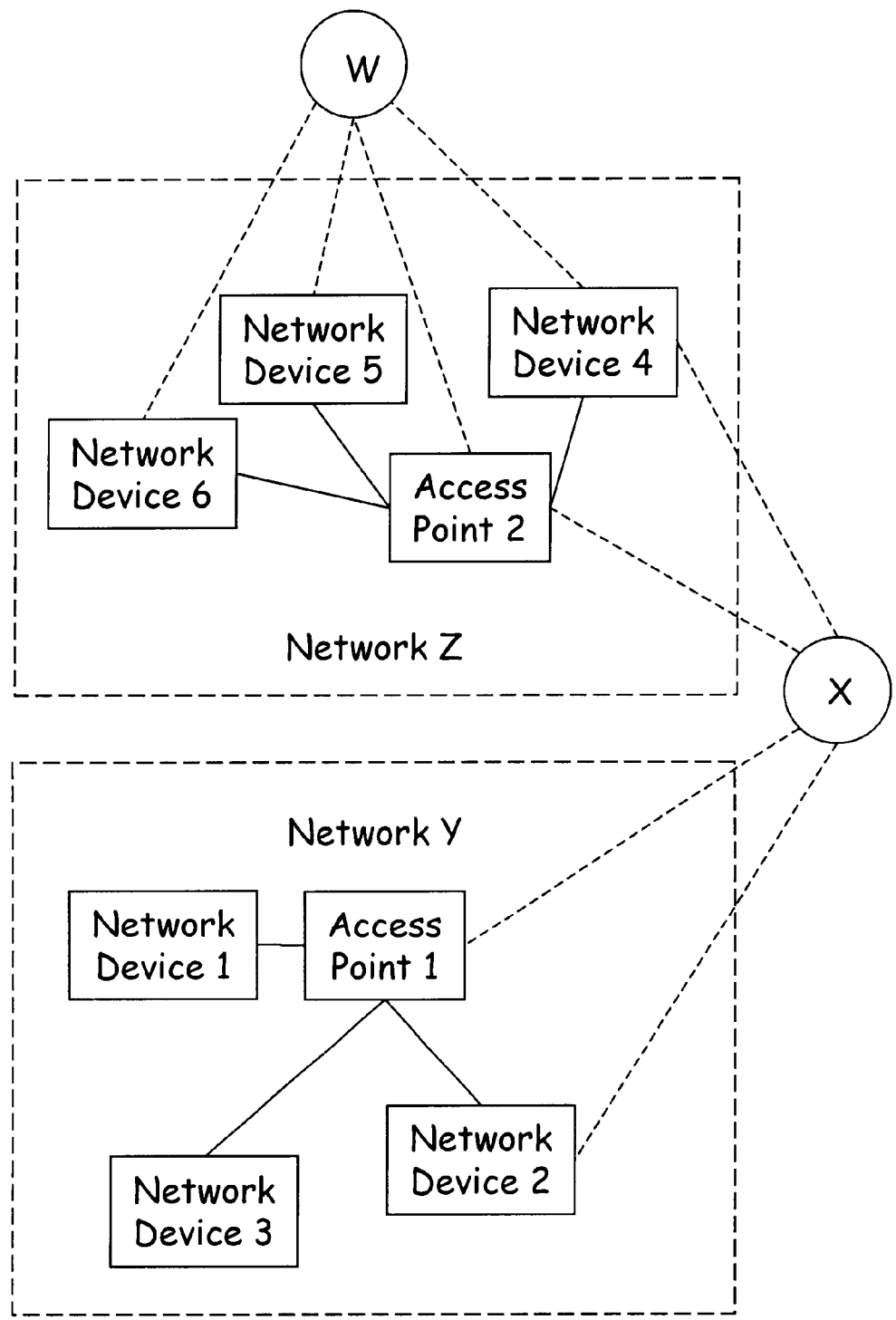
FIG. 5 is a generalized view of a plurality of specific wireless networks and how the portable wireless network analysis device of FIG. 1 can interact with such a network.

FIG. 5 is a network diagram detailing the use of an exemplary portable network detection device of FIG. 1. An access point 1 couples to a network device 1. The access point 1 also couples to a network device 2 and a network device 3. The access point 1, together with the network device 1, the network device 2, and the network device 3 form a network Y.

Correspondingly, an access point 2 couples to a network device 4. The access point 2 also couples to a network device 5 and a network device 6. The access point 2, together with the network device 4, the network device 5, and the network device 6 form a network Z.

The access point 1 and the access point 2 may be communicatively coupled. This coupling may take the form of a wired or wireless link.

In one instance, the portable wireless network analysis device as depicted in FIG. 1 is placed at a node AW. In this case, the portable wireless network analysis device may be able to obtain data flow between the various networks devices associated with the network Z. When obtaining this data traffic, the portable wireless network analysis device associated with node AW may be able to monitor either unidirectional or bi-directional data associated with communications between the network devices and the access point.

Accordingly, the portable wireless network analysis device associated with a node B is able to monitor only a portion of the network Z traffic. The portable wireless network analysis device associated with the node BX may correspondingly monitor a portion or a whole of the traffic associated with network Y.

In particular, the portable wireless network analysis device associated with the network node BX can employ a specific identification associated with the network Y, or one associated with the network Z. In this case, the portable wireless network analysis device associated with the node BX then monitors only the traffic associated with the particular network. In some cases, the portable wireless network analysis device associated with the node BX may be configured to pick up the wireless data associated with either network Y or network Z. In these cases, the portable wireless network analysis device can be used to monitor on the back end any data traffic between the networks, as well as the data traffic associated singly with either network.

Figure 6:
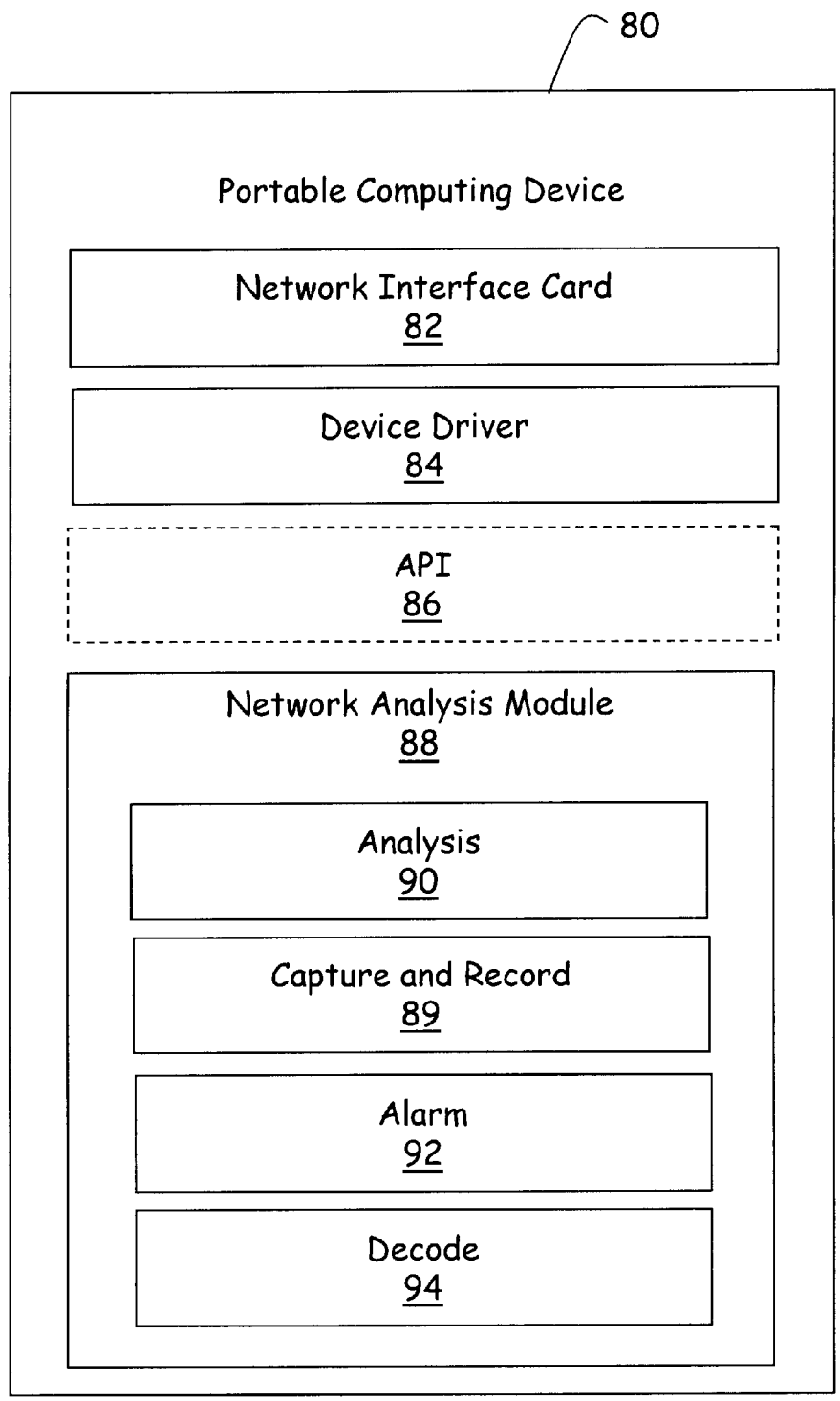
FIG. 6 is a schematic block diagram of an exemplary portable wireless network analysis device of FIG. 1.

FIG. 6 is a schematic block diagram of an exemplary portable wireless network analysis device of FIG. 1. The portable wireless network analysis device 80 contains a wireless network interface card (NIC) 82. This allows the portable wireless network analysis device 80 to maintain contact to the wireless networks and the associated network nodes that it monitors.

Typically, the NIC interfaces with a device driver 84. This device driver 84 allows the overlaying system to communicate with the hardware device.

In typical instances, an application programming interface (API) 86 is also present. This typically allows for a common interface to the device driver softwares that can exist.

The portable wireless network analysis device 80 contains a wireless network analysis module 88. The network analysis module 88 can contain several functional aspects. These include a capture and record module 89, an analysis module 90, and an alarm module 92. The analysis module 90 can contain a network parameter analysis module, traffic analyses module, decode module 94 and many of the other analyses described above in relation to FIG. 1.

Figure 7:
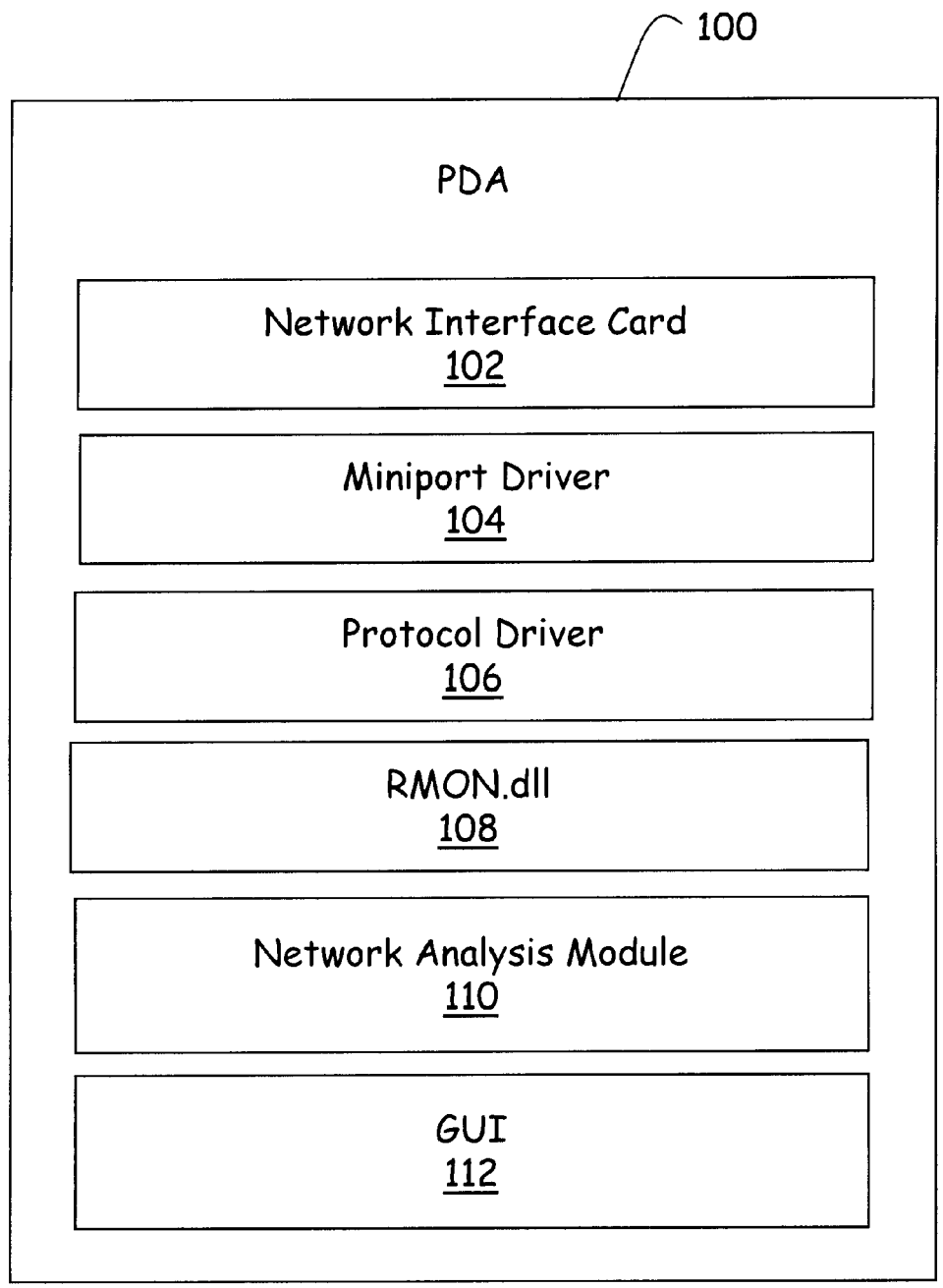
FIG. 7 is a detailed schematic block diagram of the portable wireless network analysis device of FIG. 4.

FIG. 7 is a detailed schematic block diagram of the portable wireless network analysis device of FIG. 4. In this instance, the portable wireless network analysis device 100 is implemented as a personal digital assistant. In one instance, the portable wireless network analysis device 100, or other portable wireless network analysis device mentioned herein may be implemented with a Compaq iPaq Pocket PC H3670. The portable wireless network analysis device 100 can contain a Dual-Slot PC Card Expansion Pack and run Microsoft Windows for Pocket PC 2002. The portable wireless network analysis device 100 can also has a Compaq WL110 PC Card, and may incorporate a 1 Gigabyte IBM MicroDrive (PC Card Device). It should be noted that the portable wireless network analysis device 100 may be implemented on a range of alternative portable devices, and this aspect should be construed as covering those.

The NIC 102 has a so-called miniport driver 104 associated with it. This driver 104, in combination with the NDIS.SYS supplied with the operating system allows the overlaying system to communicate with the hardware device.

Additionally the portable wireless network analysis device 100 contains a protocol driver 106 associated with the dynamically linked library RMON.DLL 108. This allows full access to the network data from the NIC 102 to the analysis module 110.

The analysis module 110 performs all or some of the functionality described with respect to the previous Figures. Additionally, a graphical user interface (GUI) module 112 is associated with the analysis module 110. This allows for operator interaction with the system, and for the operator to view the results of the analyses and/or functionality of the network monitor.

Figure 8:
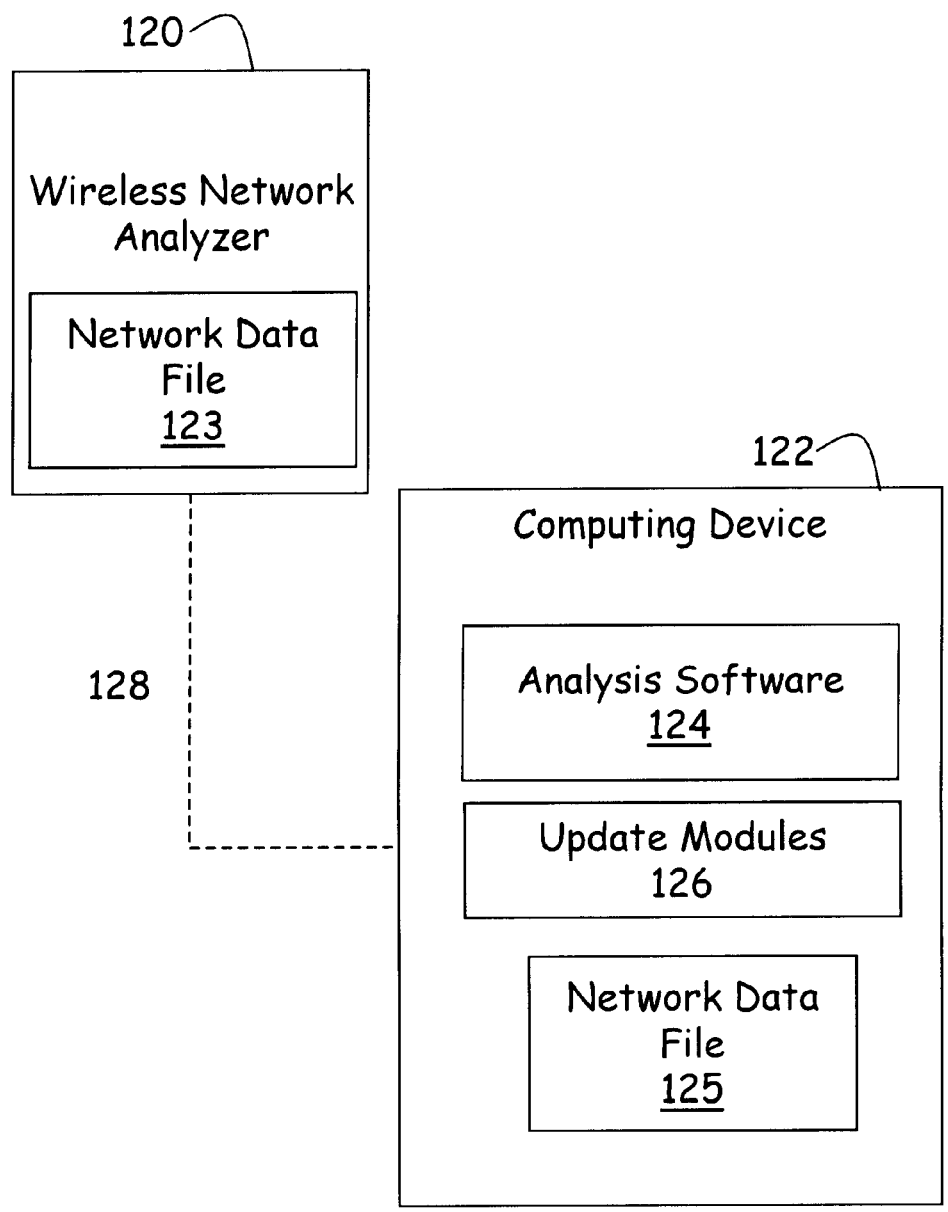
FIG. 8 is a schematic block diagram of a system employing an aspect of the invention.

FIG. 8 is a schematic block diagram of a system employing an aspect of the invention. In this case, the portable wireless network analysis device 120 has captured and recorded a file of wireless network data. The portable wireless network analysis device 120 is coupled to another more powerful computing device 122 through a data connection 128. This connection 128 may be a direct wired connection, such as a universal serial bus (USB) port, or the connection 128 may be a network connection such as a local area network. The connection 128 may be wired or wireless, in part or whole.

The contents of the recorded file 123 are relayed to the computing device 122, where the data is also stored in a file 125. The computing device 122 contains analysis software 124, which operates on the recorded file. In this manner, additional information may be gleaned from the recorded network information at some later time.

Or, the link 128 to the more powerful computing device may be used to upgrade the functionality of the portable wireless network analysis device. In this case, assume that the portable wireless network analysis device 120 is configured to read one type of wireless traffic. In short order, the computing device 122 can load into the portable wireless network analysis device 120 additional modules that enhance the functionality of the analysis module contained therein. In this case, the portable wireless network analysis device 120 may be dynamically modified to monitor alternative wireless formats, or to provide alternative analysis tools, as they may become available.

The radio signals to a wireless connection, which normally travel in all directions from an antenna, are reduced very quickly. Assume that a station and an access point can talk to each other without problems. This means that every data packet is (typically in an 802.11 network) immediately followed by a DLC layer acknowledge packet.

The current portable wireless network analysis device may be located in a position where it can only see one direction of traffic. In this case, it can only see the packets that are generated by the station. In this case, the portable wireless network analysis device is too far away from the access point to recognize those packets as error free.

The portable wireless network analysis device will see the data packets going from the station to the access point. It will miss all acknowledges from the access point. The portable wireless network analysis device will also see all acknowledgements from the station, but not the data from the access point that was acknowledged.

The portable wireless network analysis device can also monitor the signal strength for every single packet, regardless of its type (data, management or control). Using this information, the portable wireless network analysis device can correlate the active connections (stations to access points) based on the specific location where the portable wireless network analysis device was located.

The sample table below shows an exemplary display of signal strength information for the current observed radio layer connections at a certain position. Instead of numerical values, the portable wireless network analysis device can display other indicia of values. The network monitoring device can draw small indicators. These indicators may also be different colors for different signal ranges of values. Address books for address resolution can be implemented for an easier understanding of the environment. The following Table 1 is an exemplary table showing the signal strengths associated with various devices in a wireless network.

TABLE 1

| Access Point | Signal | Signal | Station |
| --- | --- | --- | --- |
| AP A | 70% | 97% | Station 1 |
| AP A | 71% | 56% | Station 2 |
| AP A | 69% | 70% | Station 3 |
| AP A | 70% | 23% | Station 4 |
| AP B | 40% | 96% | Station 5 |
| AP B | 41% | 95% | Station 6 |
| AP B | 40% | 25% | Station 7 |
| AP C | 25% | 0% | Station 8 |
| AP C | 26% | 0% | Station 9 |

Another table may be implemented including a retry counter and a physical error counter. The counters can be absolute or based on some time average. They can also be related to total packet counts. If certain thresholds are exceeded, the color can change to some notification color. Table 2 below shows such an exemplary table that shows signal strengths, errors, and retries on either side of a receiver/transmitter pair.

TABLE 2

| Access Point | Signal | Errors | Retries | Retries | Errors | Signal | Station |
| --- | --- | --- | --- | --- | --- | --- | --- |
| AP A | 70% | 34 | 12 | 0 | 3 | 97% | 1 |
| AP A | 71% | | | | | 56% | 2 |
| AP A | 69% | | | | 5 | 70% | 3 |
| AP A | 70% | 45 | 12 | 43 | 34 | 23% | 4 |
| AP B | 40% | | | | | 96% | 5 |
| AP B | 41% | | | | | 95% | 6 |
| AP B | 40% | | | | | 25% | 7 |
| AP C | 25% | | | | | 0% | 8 |
| AP C | 26% | | | | | 0% | 9 |

Another example is a resultant display that focuses on speed distribution of data packets. The user can sort the tables on based on specific aspects. Such sorting can offer even more understanding of the network. Table 3 below is exemplary of such an aspect.

TABLE 3

| Access Point | 1 MBit | 2 MBit | 5.5 MBit | 11 MBit | 11 MBit | 5.5 Mbit | 2 MBit | 1 MBit | Station |
|---|---|---|---|---|---|---|---|---|---|
| AP A | 70% | 34 | 12 | | | 0 | 3 | 97 | 1 |
| AP A | 71% | | | | | | | 56 | 2 |
| AP A | 69% | | | | | | 5 | 70 | 3 |
| AP A | 70% | 45 | 12 | | | 43 | 34 | 23 | 4 |
| AP B | 40% | | | | | | | 96 | 5 |
| AP B | 41% | | | | | | | 95 | 6 |
| AP B | 40% | | | | | | | 25 | 7 |
| AP C | 25% | | | | | | | 0 | 8 |
| AP C | 26% | | | | | | | 0 | 9 |

It should be noted that the portions of the preceding diagrams and accompanying descriptions might be joined and used with one another in many different combinations. This specification should be construed as describing the various combinations of dynamic interaction between the underlying functional units and the external environment.

As such, a method and apparatus for dynamically monitoring a wireless network is described. In view of the above detailed description and associated drawings, other modifications and variations will now become apparent to those skilled in the art. It should also be apparent that such other modifications and variations might be effected without departing from the spirit and scope of the present invention as set forth in the claims, which follow.

Accordingly, we claim:

1. An apparatus for monitoring data on a wireless network operating according to a wireless data network protocol, the apparatus comprising:
a portable wireless network analysis device, the portable wireless network analysis device comprising:
a wireless network interface that communicatively couples the portable wireless network analysis device to the wireless network and receives data flowing on the wireless network;
a network traffic analyzer, communicatively coupled to the wireless network interface, that receives the data and performs an analysis of the data received from the wireless network; and
the portable wireless network analysis device capable of being operated by user at one location and transported to second location, the portable wireless network analysis device operable to continue to monitor data on the wireless network while being transported from the first location to the second location;
wherein the portable wireless network analysis device is further capable of:
changing a channel on which the data is received,
detecting rogue access points on the wireless network,
displaying a relative load on each of a plurality of access points within a range based on a throughput,
supporting channel surfing activity,
reporting statistics related to frames including control frames, data frames, and management frames, during the channel surfing activity, and
analyzing changes selected from the group consisting of a channel change associated with a network device and a physical location change associated with the network device.

2. The apparatus of claim 1 further comprising:
a user interface that displays information about the data.

3. The apparatus of claim 2, the user interface comprising a screen.

4. The apparatus of claim 1 wherein the portable wireless network analysis device is a personal digital assistant.

5. The apparatus of claim 1 further comprising a storage system, the storage system storing the data when initiated by a user.

6. The apparatus of claim 1 further comprising a filter system, the filter system filtering the data based on a predefined criteria.

7. The apparatus of claim 6 wherein the predefined criteria is a network address.

8. The apparatus of claim 6 wherein the predefined criteria is a packet type.

9. The apparatus of claim 1 further comprising an alarm system, the alarm system indicating when a predefined network event has occurred.

10. The apparatus of claim 9 wherein the predefined network event is based on a rate of specific network events.

11. The apparatus of claim 9 wherein the predefined network event is based on a use of the network.

12. The apparatus of claim 11 wherein the predefined network event is based on a rate of data exchange.

13. The apparatus of claim 11 wherein the predefined network event is based on a utilization rate.

14. The apparatus of claim 9 wherein the predefined network event is the occurrence of a specific network event.

15. The apparatus of claim 14 wherein the specific network event indicates an error in data transmission.

16. The apparatus of claim 14 wherein the specific network event is based on a network address.

17. The apparatus of claim 14 wherein the specific network event is a predetermined number of network events.

18. An apparatus for monitoring data on a wireless network, the data transmitted according to a wireless network protocol, the data arranged in a transport protocol, the apparatus comprising:
a portable wireless network analysis device, the portable wireless network analysis device comprising:
a wireless network interface that communicatively couples the portable wireless network analysis device to the wireless network and receives data from the wireless network;
a network traffic analyzer, communicatively coupled to the wireless network interface, that receives the data and performs an analysis of the data relative to the wireless network protocol; and
the portable wireless network analysis device capable of being dynamically relocated from a first location to a second location, the portable wireless network analysis device operable to monitor the wireless network traffic while during the relocation from the first location to the second location;

wherein the portable wireless network analysis device is further capable of:
changing a channel on which the data is received,
detecting rogue access points on the wireless network,
displaying a relative load on each of a plurality of access points within a range based on a throughput,
supporting channel surfing activity,
reporting statistics related to frames including control frames, data frames, and management frames, during the channel surfing activity, and
analyzing changes selected from the group consisting of a channel change associated with a network device and a physical location change associated with the network device.

19. The apparatus of claim 18 further comprising:
a user interface that displays information about the data.

20. The apparatus of claim 19, the user interface comprising a screen.

21. The apparatus of claim 18 wherein the portable wireless network analysis device is a personal digital assistant.

22. The apparatus of claim 18 further comprising a storage system, the storage system storing the data when initiated by a user.

23. The apparatus of claim 18 further comprising a filter system, the filter system filtering the data based on a predefined criteria.

24. The apparatus of claim 23 wherein the predefined criteria is a network address.

25. The apparatus of claim 23 wherein the predefined criteria is a packet type.

26. The apparatus of claim 18 further comprising an alarm system, the alarm system indicating when a predefined network event has occurred.

27. The apparatus of claim 26 wherein the predefined network event is based on a use of the network.

28. The apparatus of claim 27 wherein the predefined network event is based on a rate of data exchange.

29. The apparatus of claim 27 wherein the predefined network event is based on a utilization rate.

30. The apparatus of claim 26 wherein the predefined network event is the occurrence of a specific network event.

31. The apparatus of claim 30 wherein the specific network event indicates an error in data transmission.

32. The apparatus of claim 30 wherein the specific network event is based on a network address.

33. The apparatus of claim 30 wherein the specific network event is a predetermined number of network events.

34. The apparatus of claim 26 wherein the predefined network event is based on a rate of specific network events.

35. A method for monitoring data on a wireless network, the data transmitted according to a wireless network protocol, the method comprising:
receiving data from the wireless network with a wireless network interface, the wireless network interface contained in a portable wireless network analysis device;
analyzing the wireless network data; and
selectively, relocating the portable wireless network analysis device from a first location to a second location, the portable wireless network analysis device still performing the steps of receiving and analyzing concurrently with the step of relocating;
wherein the portable wireless network analysis device is further capable of:
changing a channel on which the data is received,
detecting rogue access points on the wireless network,
displaying a relative load on each of a plurality of access points within a range based on a throughput,
supporting channel surfing activity,
reporting statistics related to frames including control frames, data frames, and management frames, during the channel surfing activity, and
analyzing changes selected from the group consisting of a channel change associated with a network device and a physical location change associated with the network device.

36. The method of claim 35 further comprising:
displaying information about the data from a user interface contained within the portable wireless network analysis device.

37. The method of claim 36, the user interface comprising a screen.

38. The method of claim 35 wherein the portable wireless network analysis device is a personal digital assistant.

39. The method of claim 35 further comprising:
storing the data in a storage system when initiated by a user.

40. The method of claim 35 further comprising:
filtering the data based on a predefined criteria.

41. The method of claim 40 wherein the predefined criteria is a network address.

42. The method of claim 40 wherein the predefined criteria is a packet type.

43. The method of claim 35 further comprising:
indicating when a predefined network event has occurred.

44. The method of claim 43 wherein the predefined network event is based on a use of the network.

45. The method of claim 44 wherein the predefined network event is based on a rate of data exchange.

46. The method of claim 44 wherein the predefined network event is based on a utilization rate.

47. The method of claim 43 wherein the predefined network event is the occurrence of a specific network event.

48. The method of claim 47 wherein the specific network event indicates an error in data transmission.

49. The method of claim 47 wherein the specific network event is based on a network address.

50. The method of claim 47 wherein the specific network event is a predetermined number of network events.

51. The method of claim 43 wherein the predefined network event is based on a rate of specific network events.

52. An apparatus for monitoring data on a wireless network, the data transmitted according to a wireless network protocol, the apparatus comprising a computer readable medium having instructions, the apparatus responsive to the instructions, the apparatus comprising:
instructions for receiving data from the wireless network with a wireless network interface, the wireless network interface contained in a portable wireless network analysis device;
instructions for analyzing the wireless network data; and
the portable wireless network analysis device being selectively relocatable from a first location to a second location, the apparatus operable to perform the steps of receiving and analyzing concurrently with the step of relocating;
wherein the portable wireless network analysis device is further capable of:
changing a channel on which the data is received,
detecting rogue access points on the wireless network,
displaying a relative load on each of a plurality of access points within a range based on a throughout,
supporting channel surfing activity,
reporting statistics related to frames including control frames, data frames, and management frames, during the channel surfing activity, and analyzing changes selected from the group consisting of a channel change associated with a network device and a physical location change associated with the network device.

53. The apparatus of claim 52 further comprising:
instructions for displaying information about the data from a user interface contained within the portable wireless network analysis device.

54. The apparatus of claim 53, the user interface comprising a screen.

55. The apparatus of claim 52 wherein the portable wireless network analysis device is a personal digital assistant.

56. The apparatus of claim 52 further comprising:
instructions for storing the data in a storage system when initiated by a user.

57. The apparatus of claim 52 further comprising:
instructions for filtering the data based on a predefined criteria.

58. The apparatus of claim 57 wherein the predefined criteria is a network address.

59. The apparatus of claim 57 wherein the predefined criteria is a packet type.

60. The apparatus of claim 52 further comprising:
instructions for indicating when a predefined network event has occurred.

61. The apparatus of claim 60 wherein the predefined network event is based on a rate of specific network events.

62. The apparatus of claim 60 wherein the predefined network event is based on a use of the network.

63. The apparatus of claim 62 wherein the predefined network event is based on a rate of data exchange.

64. The apparatus of claim 62 wherein the predefined network event is based on a utilization rate.

65. The apparatus of claim 60 wherein the predefined network event is the occurrence of a specific network event.

66. The apparatus of claim 65 wherein the specific network event indicates an error in data transmission.

67. The apparatus of claim 65 wherein the specific network event is based on a network address.

68. The apparatus of claim 65 wherein the specific network event is a predetermined number of network events.

69. A wireless computing network for exchanging data between network devices using a wireless data connection, the wireless computing network comprising:
a first wireless network device;
a second wireless network device communicatively coupled to the first wireless network device through the wireless data connection;
the first wireless network device and second wireless network device exchanging the data through the wireless data connection;
a handheld computing device, communicatively coupled to the first wireless network device, the handheld computing device comprising:
a wireless network interface that monitors the data on the wireless data connection; and
an analysis module, communicatively coupled to the wireless network interface, that analyzes the data;
wherein the handheld computing device is further capable of:
changing a channel on which the data is received,
detecting rogue access points on the wireless network,
displaying a relative load on each of a plurality of access points within a range based on a throughput,
supporting channel surfing activity,
reporting statistics related to frames including control frames, data frames, and management frames, during the channel surfing activity, and
analyzing changes including a channel change associated with one of the network devices and a physical location change associated with one of the network devices.

70. A handheld computing device for monitoring data on a wireless network, the wireless network communicatively coupling a first network device to a second network device, the handheld computing device comprising:
a wireless network interface that monitors the data on the wireless network; and
a network analysis module, communicatively coupled to the wireless network interface, that analyzes the data;
wherein the network analysis module is further capable of:
changing a channel on which the data is received,
detecting rogue access points on the wireless network,
displaying a relative load on each of a plurality of access points within a range based on a throughput,
supporting channel surfing activity,
reporting statistics related to frames including control frames, data frames, and management frames, during the channel surfing activity, and
analyzing changes selected from the group consisting of a channel change associated with a network device and a physical location change associated with the network device.

71. A method for analyzing a wireless network utilizing a portable wireless network analysis device, comprising:
receiving data from the wireless network with a wireless network interface, the wireless network interface contained in a portable wireless network analysis device;
analyzing the wireless network data utilizing the portable wireless network analysis device;
collecting information selected from the group consisting of source addresses, destination addresses, dropped packets, packet types, and packet sizes, utilizing the portable wireless network analysis device;
collating statistics selected from the group consisting of packet totals, distribution of packet sizes, numbers of broadcasts, numbers of multicasts, numbers of errors of varying types, channel use statistics, utilization statistics, and packet rate statistics, utilizing the portable wireless network analysis device;
decoding the data, utilizing the portable wireless network analysis device;
detecting noise associated with the receipt of the data, utilizing the portable wireless network analysis device; and
detecting a power level associated with the receipt of the data, utilizing the portable wireless network analysis device;
wherein the portable wireless network analysis device is further capable of:
changing a channel on which the data is received,
detecting rogue access points on the wireless network,
displaying a relative load on each of a plurality of access points within a range based on a throughput,
supporting channel surfing activity,
reporting statistics related to frames including control frames, data frames, and management frames, during the channel surfing activity, and
analyzing changes selected from the group consisting of a channel change associated with a network device and a physical location change associated with the network device.

72. The apparatus of claim 71, wherein the portable wireless network analysis device is further capable of collecting information including the source addresses, the destination addresses, the dropped packets, the packet types, and the packet sizes.

73. The apparatus of claim 71, wherein the portable wireless network analysis device is further capable of collating statistics including the packet totals, the distribution of packet sizes, the numbers of broadcasts, the numbers of multicasts, the numbers of errors of varying types, the channel use statistics, the utilization statistics, and the packet rate statistics.

74. The apparatus of claim 71, wherein each packet is an 802.11 network packet.

75. The apparatus of claim 71, wherein each packet is followed by a DLC layer acknowledge packet.

76. The apparatus of claim 71, wherein the portable wireless network analysis device is capable of being dynamically modified to monitor alternate wireless formats.

77. The apparatus of claim 71, wherein the portable wireless network analysis device is capable of being dynamically modified to provide alternative analysis tools.

78. The apparatus of claim 71, wherein the portable wireless network analysis device includes an application program interface (API).

\* \* \* \* \*

UNITED STATES PATENT AND TRADEMARK OFFICE
CERTIFICATE OF CORRECTION

| | |
|---|---|
| PATENT NO. | : 6,801,756 B1 |
| APPLICATION NO. | : 10/071907 |
| DATED | : October 5, 2004 |
| INVENTOR(S) | : Ajay Agrawal et al. |

It is certified that error appears in the above-identified patent and that said Letters Patent is hereby corrected as shown below:

Column 3, line 34, delete "adaptively clocked"

Column 16, line 63, replace "throughout" with --throughput--.

Signed and Sealed this

Ninth Day of January, 2007

JON W. DUDAS
*Director of the United States Patent and Trademark Office*